June 3, 1969  G. V. MOMMSEN ET AL  3,448,311
ELECTRICAL ROTOR AND METHOD OF WINDING THE SAME
Filed April 25, 1966  Sheet 3 of 3

INVENTORS
GORDON V. MOMMSEN,
BY RAYMON H. DAMMAR

Braddock & Burd
ATTORNEYS

United States Patent Office 3,448,311
Patented June 3, 1969

3,448,311
ELECTRICAL ROTOR AND METHOD OF WINDING THE SAME
Gordon V. Mommsen and Raymon H. Dammar, Minneapolis, Minn., assignors to Possis Machine Corporation, Minneapolis, Minn., a corporation of Minnesota
Filed Apr. 25, 1966, Ser. No. 544,794
Int. Cl. H02k 3/00
U.S. Cl. 310—234          6 Claims

ABSTRACT OF THE DISCLOSURE

An electrical rotor, the leads of which are at least nearly tangent to the insulating material on the shaft between the core laminations and an external circuit connector element such as a commutator.

---

This invention relates to a method for winding a rotor for an electrical machine, as an electric motor. More particularly the invention relates to winding a rotor to avoid intolerable bridging of the leads though extending directly from a coil slot in which an electrically effective coil loop is wound rather than a crossover loop.

Each coil in the rotor of this invention has the usual starting and ending leads. They are kept near enough to the shaft between the core and the commutator to avoid intolerable bridging. Heretofore, this was achieved by extending both starting and ending leads from similar locations on the core by the technique known as crossover. In this invention, the ending lead of this coil extends directly from the slot in the core in which the last coil side of a coil is wound to a segment adjacent the segment to which the starting lead is secured. The starting lead must be carried far enough around the shaft so that the terminal leads can take this direct path without being impinged upon by subsequently wound coils to the extent that undesirable bridging occurs.

Bridging is defined as being that condition which exists when coil ends are supported in whole or in part by leads from preceding coils rather than the rotor core or preceding coil ends. This becomes undersirable or even intolerable if by bridging pressure the leads are stretched enough to seriously affect the integrity of wire insulation, wire size or resistance to injury by vibration. Bridging is also intolerable if some of the coil ends are in engagement with the commutator at places where they should not or are outside of an axial projection of the core so as to be in danger of striking the housing.

The winding of the wire into the armature core slots may be accomplished by a winding machine having any suitable means to produce relative movement between the wire and the core to wind the wire into chosen slots. When the coil is complete, the ending lead of wire is moved to and engaged with a segment adjacent to the segment to which the starting lead will ultimately be secured. The ending lead of each coil becomes the starting lead of the next and all are secured in a similar manner to consecutive adjacent segments. By winding the armature cores according to this invention there is eliminated the waste of wire, and the lost motion and time in the process of winding the wire on the core as well as electrical inefficiency in the armature which are disadvantages of the conventional crossover method of winding wire on an armature core.

Figure 1:
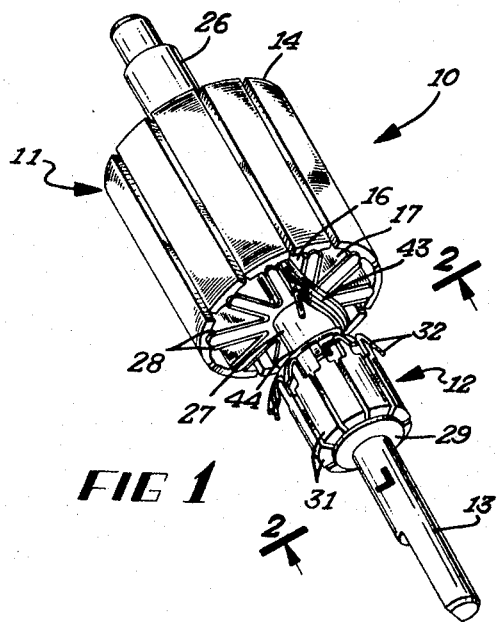
Figure 2:
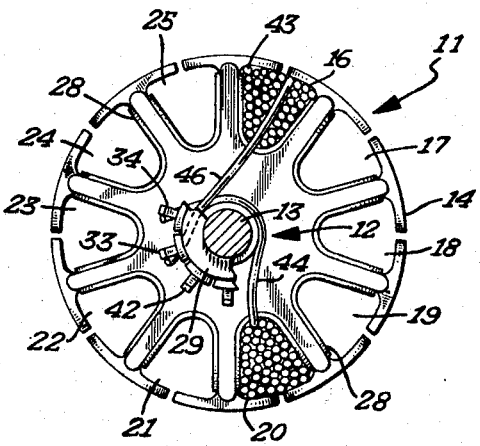
Figure 3:
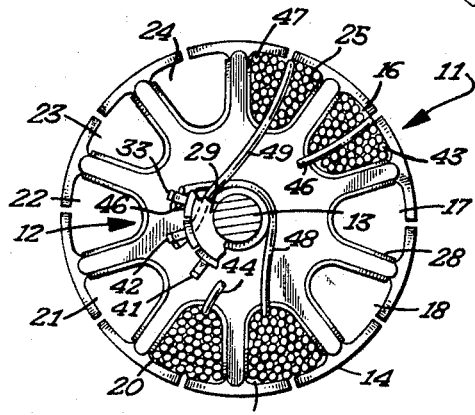
Figure 5:
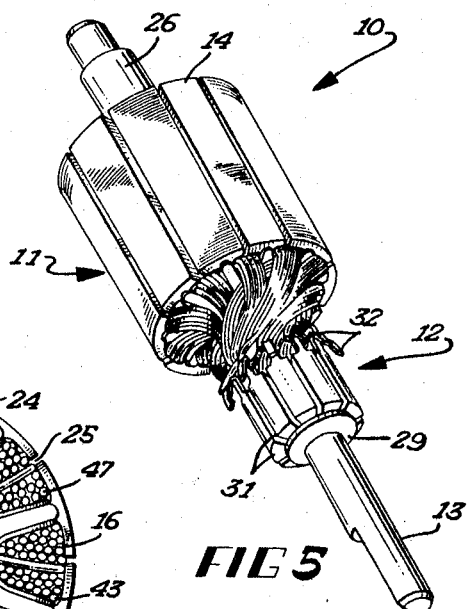
Figure 4:
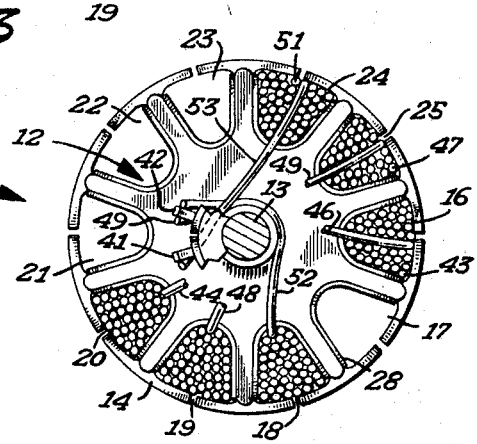
Figure 6:
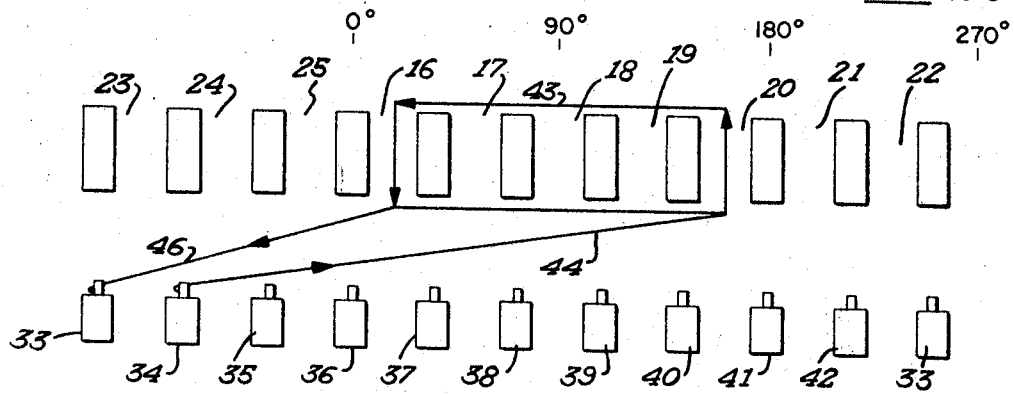
Figure 7:
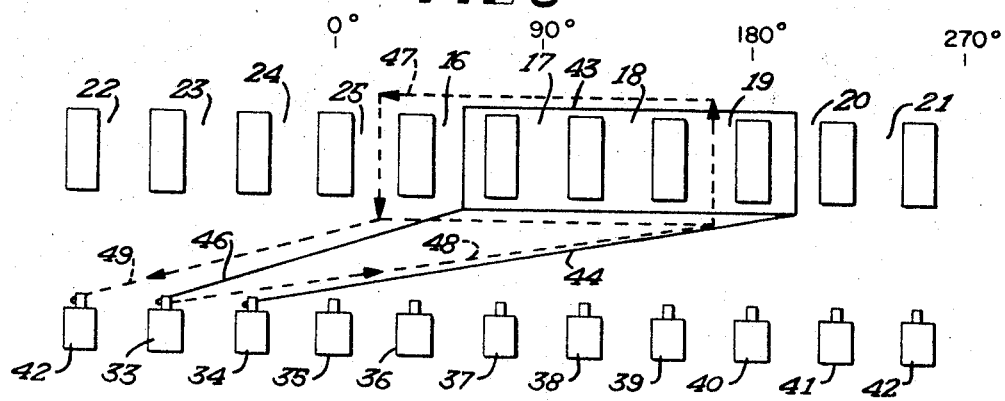
Figure 8:
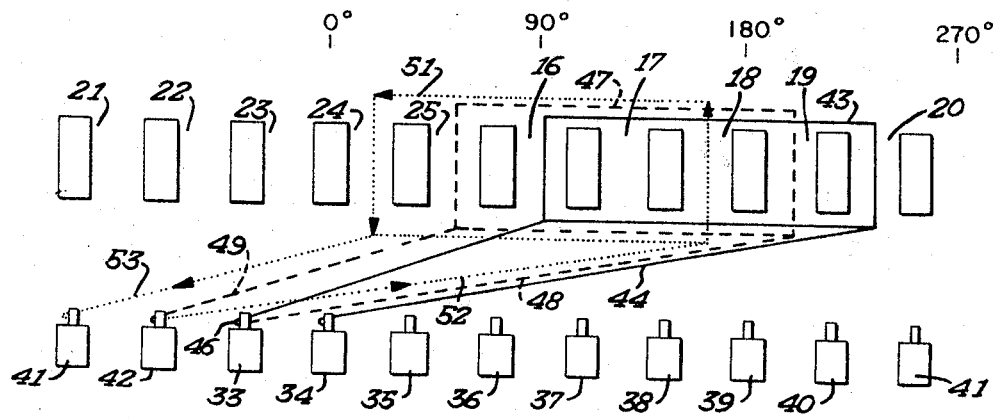
Figure 9:
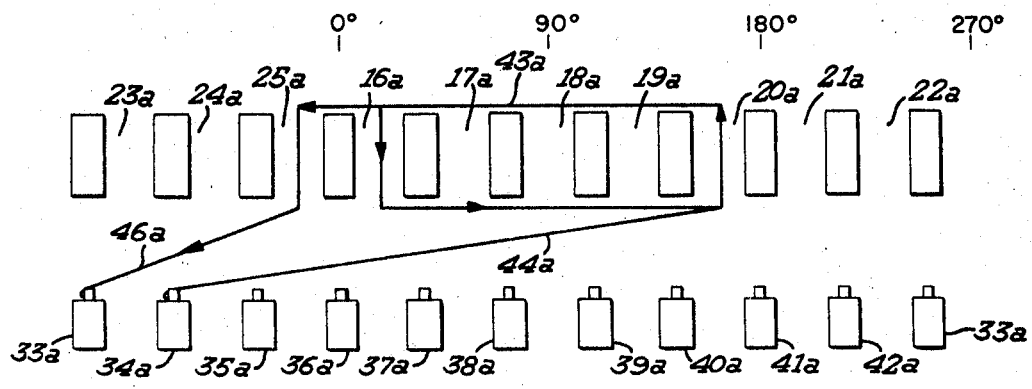
Figure 10:
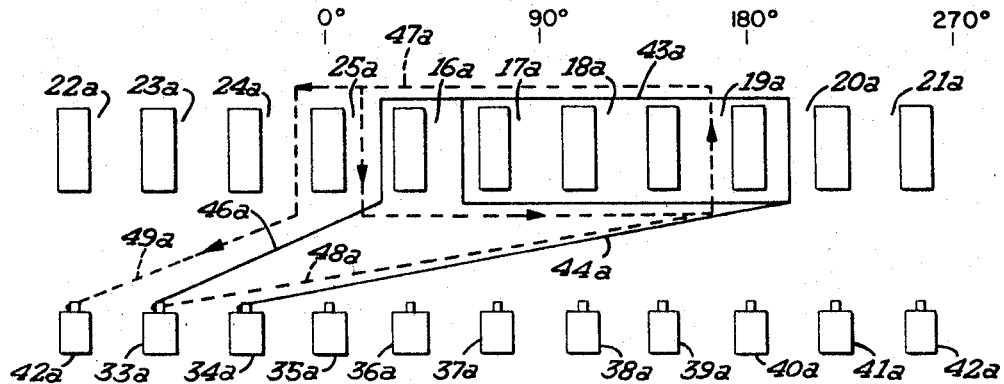
Figure 11:
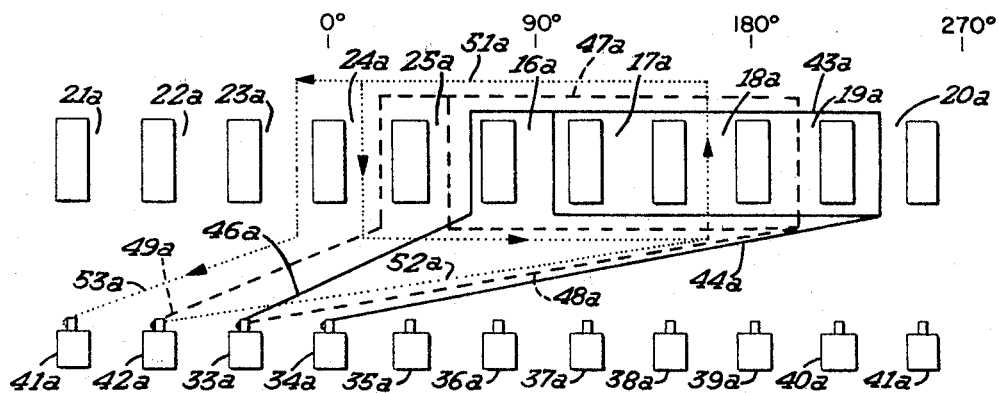

In the drawings:
FIGURE 1 is a perspective view of a rotor for an electrical machine showing the first coil of wire wound on the core of the armature with the leads of the wire secured to adjacent segments of the commutator;
FIGURE 2 is an enlarged sectional view taken along the line 2—2 of FIGURE 1 showing the coil of wire wound on the core in section and the location of the leads of the wire relative to the sleeve and shaft;
FIGURE 3 is a view similar to FIGURE 2 showing the rotor indexed to a second position and a second coil of wire wound on the core with the leads of the wire secured to adjacent segments of the commutator;
FIGURE 4 is a view similar to FIGURE 2 showing the rotor indexed to a third position and a third coil of wire wound on the core;
FIGURE 5 is a perspective view of the rotor with all the coils of wire wound on the core of the armature and the leads of the wire secured to segments of the commutator;
FIGURE 6 is a single plane wiring diagram illustrating the location of the first coil of wire on the armature core and the location of the commutator segments with the leads of the wire secured to adjacent segments;
FIGURE 7 is a view of a wiring diagram similar to FIGURE 6 showing the positions of the first and second coils of wire wound on the armature core and the locations of the wire leads relative to adjacent commutator segments;
FIGURE 8 is a wiring diagram similar to FIGURE 7 showing the positions of the first, second and third coils of wire wound on the armature core and the locations of the wire leads secured to adjacent commutator segments;
FIGURE 9 is a wiring diagram showing a modified form of the invention with one coil wound;
FIGURE 10 is a wiring diagram of the device in FIGURE 9 but with two coils wound; and
FIGURE 11 is a wiring diagram of the device in FIGURE 9, but with three coils wound.

Referring to the drawings, there is shown in FIGURE 1 a rotor 10 for an electrical machine, as a motor, comprising generally an armature 11 and a commutator 12 mounted in axial alignment on a shaft 13.

Armature 11 has the customary soft iron core 14 comprising a plurality of laminations having a plurality of circumferentially spaced T-shaped radial fingers forming the usual longitudinal slots indicated in a clockwise direction from the top by numbers 16 to 25. Insulative material, such as sleeves 26 and 27 and cell members 28, is positioned to insulate the slots from the wound wire.

Commutator 12 mounted on shaft 13 adjacent the end of sleeve 27 is of any suitable construction such as cylindrical member 29 of insulative material, and a plurality of circumferential, conducting segments 31 secured to and forming the outer face of cylindrical member 29. The end of each segment 31 facing armature 11 has an outwardly opened hook 32 projected upwardly and forwardly away from the armature to receive the leads. Hooks 32 are generally in longitudinal alignment with the T-shaped fingers of armature core 14. As shown in FIGURES 6, 7 and 8, commutator segments 31 are individually identified with reference numerals 33 to 42. Armature core 14 shown in FIGURE 1 has ten slots and commutator 12 has ten segments.

Referring to FIGURES 1, 2, 3 and 4 and specifically to FIGURE 2, an exemplary pattern is shown in which a first coil of wire 43 is wound onto the armature core 14 in longitudinal slots 16 and 20 which often lies in a substantially vertical plane in modern winding equipment. The angular position of the core is determined by an indexing mechanism of the machine used to wind the wires about the armature core. The starting lead 44 of the wire will eventually be secured to the hook on commutator segment 34 and as hereshown must extend more than 180° around shaft 13 and into longitudinal slot 20. A plurality of turns of the wire are wrapped into slots 16 and 20 by the mechanism of the winding machine. The ending lead 46 of the wire projects radially inwardly from the coils located in slot 16 and in this case must extend nearly tangentially of shaft 13 or more accurately, insulating sleeve 27 as shown most clearly in FIGURES 2, 3 and 4. In the alternative, the sleeve 27 and shaft 13 may be thought of together as the shaft insofar as that term has meaning for this invention. It is the support of the leads that is important as previously noted. This lead extends to the far side of the hooks on commutator segment 33. In the example shown, segment 33 is approximately 230° counterclockwise from the radial plane passing through slot 20 and segment 34 is approximately 125° counterclockwise from the plane passing through the slot 16 in each case when the rotor is viewed as shown. The amount of angular displacement may vary considerably from rotor core to rotor core.

As shown in FIGURE 3, armature 11 has been indexed clockwise one position to move the slots 25 and 19 in a vertical plane for receiving a second coil 47. The starting lead 48 of second coil 47 is, of course, a continuation of lead 46 and is also hooked on commutator segment 33. Lead 48 extends from segment 33 to the bottom of groove 19 around shaft 13 in a similar manner as lead 44 extends to groove or slot 20. Ending lead 49 extends from slot 25 downwardly substantially tangent to shaft 13. The end of lead 49 extends to the far side of the hook on commutator segment 42 which is adjacent segment 33.

On indexing armature 11 to the next or second position slots 24 and 18 are in a vertical plane as shown in FIGURE 4 for receiving a third coil 51. Starting lead 52 of coils 51 is located under the hook 32 on segment 42 and extends from segment 42 around shaft 13 more than 180° and runs into slot 18. The ending lead 53 of coil 51 extends downwardly from slot 24 generally tangent to shaft 13 and extends around the far side of the hook on commutator segment 41.

The remaining coils are placed on the armature core in the same manner. Armature 11 is successively indexed to positions wherein a pair of slots are in vertical alignment. At each indexed position wire is wound on the core to form a coil in the vertically aligned slots. The leads of these coils are attached to successive adjacent segments similar to the first, second and third coils 43, 47 and 51 shown in FIGURES 2, 3 and 4. When all the coils are wound on the armature core, the resultant rotor has both the starting leads and the ending leads of all the coils sufficiently close to the sleeve 27 between armature 11 and commutator 12 to avoid any bridging. This winding is accomplished without use of crossover anchoring of the ending leads.

In terms of a method of winding a rotor of an electrical machine the invention comprises the steps of initially choosing a hook to which the starting lead 44 of the first coil 43 will ultimately be secured such that the adjacent hook, used for the ending lead, will cause the terminal lead of that coil to lie close enough to the shaft 13 to avoid intolerable or even undesirable bridging. As shown in the drawings, coil 43 is built up by winding the wire in a pair of slots 16 and 20 until the desired amount of turns are located in these slots. Thereafter, lead 46 is carried directly from a regular or electrically effective coil leg to the commutator. Ending lead 46 is secured to the hook on segment 33 located in a counterclockwise direction adjacent to segment 34. Lead 44 extends around this hook from the far side of the hook. Additional coils of wire are wound in sequence onto armature core 14 in a similar manner. This causes the ending leads to be positioned as close to shaft 13 as necessary to avoid undesirable and certainly to avoid intolerable bridging. In this invention, therefore, the beginning and ending leads for one coil extend from spaced slots in the core to adjacent commutator segments and also lie close enough to the shaft of the rotor to avoid having any substantial tension placed on them by subsequently wound coils. This is in distinction in structure of a crossover wind rotor where the leads extend from adjacent slots in the core to adjacent commutator segments.

FIGURE 8 shows the wiring diagram for the first three coils of wire. A rotor constructed in accordance with this method has the advantages of a crossover type wind without the disadvantages resulting specifically from the use of crossover.

In FIGURES 9 through 11 are shown three different stages of winding an armature core and commutator differently from the one shown in FIGURES 6, 7 and 8. To make direct comparison easy, all of the various slots and commutator segments are given the same numbers as their counterparts in FIGURES 6, 7 and 8 followed by the suffix *a*.

In FIGURE 9 the coil is commenced in exactly the same way that it is started in FIGURE 6. The difference between what is illustrated in FIGURE 9 and what is illustrated in FIGURE 6 lies in terminating the coil. In FIGURE 6 is depicted a coil which is completely formed, the flyer stopped on the side of the core adjacent to the commutator at which time the core is indexed. Terminating lead wire 46 is then hooked on the commutator segment and lead 48 states a new coil without more ado. In FIGURE 9, after the coil is largely completed by being wound in slots 20*a* and 16*a*, the core is indexed and the wire is carried over to slot 25*a* in order to make lead 46*a* instead of bringing the wire down through the slot 16. The armature is indexed with the winding mechanism halted before the final slot leg is laid. Wire is then laid in slot 25*a*, and thereafter the wind is halted so that a lead can be made and a new coil is started without further indexing. This is shown in FIGURE 10 with the broken line leads 48*a* and 49*a* which disclose the same general pattern as shown in FIGURE 9 with respect to leads 44*a* and 46*a*. FIGURE 11 parallels FIGURE 8 and shows how the diagram looks when a third coil is laid into the core. Legs 52*a* and 53*a* complete the dotted line coil circuit which completes a three coil pattern corresponding to that of FIGURES 6, 7 and 8.

Since the leads 46*a*, 49*a* and 53*a* are one slot closer to the commutator segments 33*a*, 42*a* and 41*a* than are the corresponding leads and commutator segments in FIGURES 6, 7 and 8, wiring diagrams 9, 10 and 11 represent a structure in which there is a difference in the distance between the core and the commutator segments than the device shown in FIGURES 6, 7 and 8. In the alternative a different number of turns of wire per coil or wire size may alter what is tolerable in bridging as between FIGURES 6, 7 and 8 and 9, 10 and 11. If the requirements in terms of distance between armature slots and commutator segments were the same for a unit to be wound as shown in FIGURES 9, 10 and 11 as in 6, 7 and 8, then it would be desirable to make the starting lead extend one commutator segment further from its slot than initially so that the terminating leads would be an equal distance and angle relative to the shaft. In both of these winds, however, whether the indexing is done before or after the lead is wound through to the commutator side of the core, in each instance a non-bridging structure is created but without the use of crossover leads. There may well be other ways in which the concepts taught here can be used in terms of when indexing occurs, etc., but when the main inventive thought is to have coil leads extend directly from electrically effective coil legs, as distinguished from the electrically canceling legs used in crossover, that are secured to commutator segments far enough removed from the slots in which the legs lie to avoid intolerable bridging.

The invention is to be limited only by the terms and the scope of the following claims.

The embodiments of the invention in which an exclusive property or privilege is claimed are defined as follows:

1. A method of winding a rotor having a shaft, a sleeve on the shaft, an armature core with more than three longitudinal slots mounted on the shaft and a commutator having a plurality of segments mounted on the shaft axially spaced from the armature core by said sleeve whereby the leads extend from said core to said commutator comprising the steps of: holding the starting lead of the first coil of wire, winding the wire about the armature core in a pair of circumferentially spaced slots to form a first coil, extending the ending lead of the first coil from the slot of said pair to which said starting lead does not extend to a segment of said commutator circularly spaced from the armature core slot from which said ending lead of said first coil extends as to cause said ending lead to be at least substantially tangent to the sleeve on the shaft to avoid intolerable bridging, winding additional wire about the armature core in other similarly spaced slots to form successive coils, and securing the successive ending leads correspondingly to successive commutator segments; whereby none of the leads leading to coils from said commutator supports any part of any succeeding coil end to the extent that the lead is injured.

2. The method of winding a rotor as defined in claim 1 wherein the starting leads are secured to commutator segments circumferentially removed around the shaft more than 180° from the slots to which the leads extend.

3. A rotor for an electrical machine comprising a shaft, an armature mounted on said shaft, said armature having a core with at least four longitudinal slots, a sleeve on said shaft, a plurality of coils of wire wound on said core in said slots, a commutator mounted on said shaft axially spaced from one end of the armature by said sleeve, said commutator having a plurality of conductor segments, each coil of wire having a starting lead and an ending lead extending from circularly spaced slots in said core to commutator conductor segments adjacent to each other, said leads extending from said slots to one of said segments circularly spaced from said slots sufficiently for said leads to be located at least substantially tangent to said sleeve on said shaft to avoid intolerable bridging.

4. The rotor defined in claim 3 wherein the slot and segment connected to said starting leads are spaced more than 180° around said shaft.

5. The method of winding a rotor as defined in claim 1 wherein the starting leads are secured to commutator segments circumferentially removed around the shaft at least 120° from the slots to which the leads extend.

6. The rotor defined in claim 3 wherein the slot and segment connected to said starting leads are spaced at least 120° around said shaft.

References Cited

UNITED STATES PATENTS

| | | | |
|---|---|---|---|
| 2,756,354 | 7/1956 | Baron | 310—234 |
| 3,191,269 | 7/1965 | Moore | 29—598 |

WARREN E. RAY, *Primary Examiner.*

R. SKUDY, *Assistant Examiner.*

U.S. Cl. X.R.

310—236, 265